United States Patent
Park et al.

(10) Patent No.: US 9,249,338 B2
(45) Date of Patent: *Feb. 2, 2016

(54) ANTI-FINGERPRINT COATING COMPOSITION AND FILM USING THE SAME

(75) Inventors: Byung Ha Park, Suwon-si (KR); In Oh Hwang, Seongnam-si (KR); Cheol Ham, Yongin-si (KR); Ki Yong Song, Seoul (KR); Soo-Jin Park, Hwaseong-si (KR); Sung Jun Park, Hwaseong-si (KR); Woo Taek Hwang, Seoul (KR); Myung Gon Kim, Hwaseong-si (KR); Seung Taek Oh, Seoul (KR); Saim Saher, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 239 days.

This patent is subject to a terminal disclaimer.

(21) Appl. No.: 13/560,714

(22) Filed: Jul. 27, 2012

(65) Prior Publication Data
US 2013/0025503 A1    Jan. 31, 2013

(30) Foreign Application Priority Data
Jul. 27, 2011 (KR) .................. 10-2011-0074459

(51) Int. Cl.
| C09D 5/00 | (2006.01) |
| C07F 7/08 | (2006.01) |
| C09D 183/04 | (2006.01) |
| C09D 5/16 | (2006.01) |
| G06F 3/0354 | (2013.01) |
| G06F 3/041 | (2006.01) |

(52) U.S. Cl.
CPC ............ *C09D 183/04* (2013.01); *C09D 5/1675* (2013.01); *G06F 3/03547* (2013.01); *G06F 3/0412* (2013.01); *G06F 2203/04103* (2013.01)

(58) Field of Classification Search
USPC ............... 428/216, 446, 336, 447; 427/255.7; 106/287.12, 287.14
See application file for complete search history.

(56) References Cited

U.S. PATENT DOCUMENTS

| 5,811,566 A * | 9/1998 | Watabe et al. ................. 556/445 |
| 8,217,129 B2 * | 7/2012 | Farris et al. ...................... 528/15 |
| 8,877,886 B2 * | 11/2014 | Souda et al. .................... 528/23 |

(Continued)

FOREIGN PATENT DOCUMENTS

| EP | 556518 A2 * | 8/1993 |
| EP | 0779319 A1 | 6/1997 |

(Continued)

OTHER PUBLICATIONS

STIC Structure Search Report.*
(Continued)

*Primary Examiner* — Tahseen N Khan
(74) *Attorney, Agent, or Firm* — Staas & Halsey LLP

(57) ABSTRACT

Disclosed herein is an anti-fingerprint coating composition, a coating composition for forming thin films that prevents fingerprints adhered to displays or touch panels from being remarkably visible and exhibits superior durability and slip properties, and a method for preparing the same.

The anti-fingerprint coating composition is prepared by mixing a silane compound having an alkyl group with distilled water or acid.

17 Claims, 7 Drawing Sheets
(1 of 7 Drawing Sheet(s) Filed in Color)

(56) References Cited

U.S. PATENT DOCUMENTS

| | | | |
|---|---|---|---|
| 2008/0305350 A1 * | 12/2008 | Agata | 428/522 |
| 2011/0105678 A1 | 5/2011 | Jung et al. | |
| 2012/0174823 A1 * | 7/2012 | Ham et al. | 106/287.14 |
| 2013/0143017 A1 * | 6/2013 | Park et al. | 428/216 |

FOREIGN PATENT DOCUMENTS

| | | |
|---|---|---|
| EP | 1634933 | 3/2006 |
| EP | 2474577 | 7/2012 |
| JP | 2002-1873 | 1/2002 |
| JP | 2011068000 | 4/2011 |
| KR | 10-2006-0107089 | 10/2006 |
| RU | 2009 114 821 A | 10/2010 |
| WO | WO 2011068251 A1 * | 6/2011 |

OTHER PUBLICATIONS

International Search Report mailed Feb. 1, 2013 for corresponding International Application No. PCT/KR2012/005903.
European Search Report dated Nov. 7, 2012 in application No. 12177996.1.
European Decision on Grant dated Jan. 7, 2015 in corresponding European Patent Application No. 12177996.1.
Russian Office Action dated Jul. 16, 2015 in corresponding Russian Patent Application No. 2014102415/05(003623) (16 pp.).

* cited by examiner (a)

TABLE 2

| | Comparative Example 2 | Preparation Example 1 |
|---|---|---|
| Contact angle (DI/DM) | 115/90 | 70/40 |
| Abrasion resistance (number of erasing) | < 10,000 | >10, 000 |
| Saline spray testing | Bad abrasion resistance | Superior abrasion resistance |
| Visibility |  | |

| | Comparative Example 2 | Preparation Example 1 |
|---|---|---|
| Contact angle (DI/DM) | 115/90 | 70/40 |
| Abrasion resistance (number of erasing) | < 10,000 | >10, 000 |
| Saline spray testing | Bad corrosion resistance | Superior corrosion resistance |
| Visibility | Compatarative Example 2 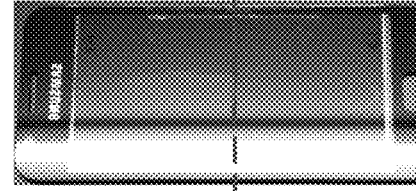 | Preparation Example 1 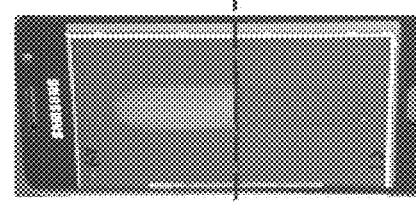 |

ANTI-FINGERPRINT COATING COMPOSITION AND FILM USING THE SAME

CROSS-REFERENCE TO RELATED APPLICATIONS

This application claims the benefit of Korean Patent Application No. 10-2011-0074459, filed on Jul. 27, 2011 in the Korean Intellectual Property Office, the disclosure of which is incorporated herein by reference.

BACKGROUND

1. Field

Embodiments of the present invention relate to an anti-fingerprint coating composition with superior durability, and a thin film formed using the same.

2. Description of the Related Art

The surfaces of displays of electronic products, for example, screens of TVs, screens of PC or notebook monitors, screens of mobile equipment such as cellular phones or PDAs, or touch panels of electronic products are readily stained with fingerprints or components of the face such as lipids or proteins. Thus these stains are remarkably visible to the naked eye and the display appears dirty when coming in contact with the hands or face of users during calling.

Accordingly, a method in which an anti-fingerprint coating layer is formed by forming a waterproof and oilproof fluorine-containing thin film on the surface of displays or coating the surface of displays with a waterproof silicone resin skeleton is incorporated.

However, these methods do not prevent adhesion of lipids, the main component of fingerprints and enable the fingerprints to be cleaned. For this reason, fingerprints present on product surfaces dirty the appearance thereof, and problems associated with durability, in which lifespan of thin coating films is only several months, occur when repeatedly cleaned.

SUMMARY

Additional aspects and/or advantages will be set forth in part in the description which follows and, in part, will be apparent from the description, or may be learned by practice of the invention.

Therefore, it is an aspect of the present disclosure to provide a coating composition capable of preventing fingerprints adhered to displays or touch panels from being remarkably visible and maintaining anti-fingerprint performance for a long period of time due to superior durability, and a coating thin film using the same.

In accordance with one aspect of the present disclosure, a coating composition contains: a silane oligomer having an $R_1$ group represented by Formula 1 of $[R_aO-(CH_2CH_2O)_p-R_b-]$ wherein $R_a$ is selected from the group consisting of hydrogen and an alkyl group having 1 to 3 carbon atoms; $R_b$ is selected from the group consisting of an alkyl group having 5 to 20 carbon atoms, an alkenyl group having 5 to 20 carbon atoms, an alkynyl group having 5 to 20 carbon atoms, an aryl group having 5 to 20 carbon atoms, an arylalkyl group having 6 to 20 carbon atoms, a cycloalkyl group having 5 to 20 carbon atoms and a heteroalkyl group having 5 to 20 carbon atoms; and p is an integer of 1 to 12; and an $R_2$ group represented by Formula 2 of $(R_c)_q$ wherein $R_c$ is a cycloalkyl group having 3 to 20 carbon atoms; and q is an integer of 1 to 3.

The $R_1$ group may be at least one selected from the group consisting of a methoxyethoxyundecyl group, a methoxytrig-lycoloxy-undecyl group, a 3-methoxyethoxy-4-acetoxycyclohexylethyl group, a 16-(2-methoxy-ethoxy)hexadecyl group and derivatives thereof.

The $R_2$ group may be at least one selected from the group consisting of a 3-cyclopentadienylpropyl group, a dicyclopentyl group, a cyclopentyl group, a cyclohexyl group, a cyclooctyl group and derivatives thereof.

The silane oligomer may have a molecular weight of 100 to 10000.

The thin film formed using the silane oligomer may have a contact angle to water of 60 to 80 degrees and a contact angle to diiodomethane of 0 to 45 degrees.

In accordance with another aspect, a coating composition comprises: 45 to 49.5% by weight of a silane compound represented by Formula 1 of $[R_aO-(CH_2CH_2O)_p-R_b-]$ wherein $R_a$ is selected from the group consisting of hydrogen and an alkyl group having 1 to 3 carbon atoms; $R_b$ is selected from the group consisting of an alkyl group having 5 to 20 carbon atoms, an alkenyl group having 5 to 20 carbon atoms, an alkynyl group having 5 to 20 carbon atoms, an aryl group having 5 to 20 carbon atoms, an arylalkyl group having 6 to 20 carbon atoms, a cycloalkyl group having 5 to 20 carbon atoms and a heteroalkyl group having 5 to 20 carbon atoms; and p is an integer of 1 to 12; 45 to 49.5% by weight of a silane compound having an $R_2$ group represented by Formula 2 of $(R_c)_q$ wherein $R_c$ is a cycloalkyl group having 3 to 20 carbon atoms, and q is an integer of 1 to 3; and 1 to 10% by weight of $H_2O$ or acid.

The $R_1$ group may be at least one selected from the group consisting of a methoxyethoxyundecyl group, a methoxytrig-lycoloxy-undecyl group, a 3-methoxyethoxy-4-acetoxycyclohexylethyl group, a 16-(2-methoxy-ethoxy)hexadecyl group and derivatives thereof.

The $R_2$ group may be at least one selected from the group consisting of a 3-cyclopentadienylpropyl group, a dicyclopentyl group, a cyclopentyl group, a cyclohexyl group, a cyclooctyl group and derivatives thereof.

The silane oligomer may have a structure of Formula 3 below.

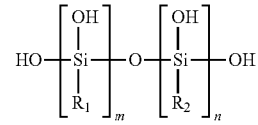

Formula 3 wherein m and n are each independently integers of 1 to 10.

The coating composition may have a molecular weight of 100 to 10000.

The thin film formed using the coating composition may have a contact angle to water of 60 to 80 degrees and a contact angle to diiodomethane of 0 to 45 degrees.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects of the invention will become apparent and more readily appreciated from the following description of the embodiments, taken in conjunction with the accompanying drawings of which:

FIG. 2, part (b) is a view showing contact angles of water ($H_2O$) and diiodomethane present on the surface of a substrate coated with the compound according to one embodiment of the present invention and a reflection state of light;

FIG. 7 shows Table 2.

DETAILED DESCRIPTION

Figure 1:
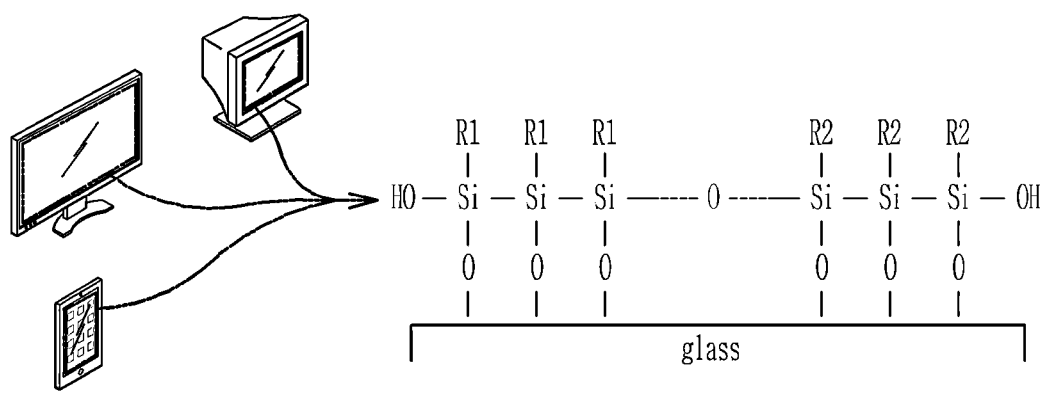
FIG. 1 is a view illustrating a phenomenon occurring when a silane compound according to one embodiment of the present invention is coated on the surface of a substrate.

Reference will now be made in detail to the embodiments of the present invention, examples of which are illustrated in the accompanying drawings, wherein like reference numerals refer to like elements throughout.

The coating composition according to one embodiment of the present invention contains a silane oligomer having an $R_1$ group represented by Formula 1 of [$R_a$O—($CH_2CH_2O$)$_p$—$R_b$—] and an $R_2$ group represented by Formula 2 of ($R_c$)$_q$.

In Formula 1, $R_a$ is selected from the group consisting of hydrogen and an alkyl group having 1 to 3 carbon atoms in which the alkyl group is substituted or unsubstituted. In Formula 1, $R_b$ is selected from the group consisting of a substituted or unsubstituted alkyl group having 5 to 20 carbon atoms, a substituted or unsubstituted alkenyl group having 5 to 20 carbon atoms, a substituted or unsubstituted alkynyl group having 5 to 20 carbon atoms, a substituted or unsubstituted aryl group having 5 to 20 carbon atoms, a substituted or unsubstituted arylalkyl group having 6 to 20 carbon atoms, a substituted or unsubstituted cycloalkyl group having 5 to 20 carbon atoms and a heteroalkyl group having 5 to 20 carbon atoms. As set forth above, the reactive groups may be substituted or unsubstituted. In Formula 1, p is an integer of 1 to 12.

In Formula 2, $R_c$ is a cycloalkyl group having 3 to 20 carbon atoms, which may be substituted or unsubstituted. In Formula 2, q is an integer of 1 to 3.

The $R_1$ group may be at least one selected from the group consisting of a methoxyethoxyundecyl group, a methoxytriglycoloxy-undecyl group, a 3-methoxyethoxy-4-acetoxycyclohexylethyl group, a 16-(2-methoxy-ethoxy)hexadecyl group and derivatives thereof.

The $R_2$ group may be at least one selected from the group consisting of a 3-cyclopentadienylpropyl group, a dicyclopentyl group, a cyclopentyl group, a cyclohexyl group, a cyclooctyl group and derivatives thereof.

The coating composition is formed by mixing 45 to 49.5% by weight of the silane compound having the $R_1$ group, 45 to 49.5% by weight of the silane compound having the $R_2$ group and 1 to 10% by weight of $H_2O$ or acid, wherein $R_1$ and $R_2$ groups are as described above.

Therefore, the composition according to one embodiment of the present invention comprises 49.5% by weight of the silane compound having the $R_1$ group, 45 to 49.5% by weight of the silane compound having the $R_2$ group and 1 to 10% by weight of $H_2O$ or acid.

In addition, when a weight ratio of two silane compounds and distilled water is 1:1:0.01 to 1:1:0.1, both anti-fingerprint properties and slip sensation are superior. However, the present invention is not limited to this weight ratio.

In addition, when the molecular weight of the silane oligomer exceeds 30,000, the silane oligomer becomes a gel and it is not easy to form thin films. Accordingly, in order to maintain a liquid phase, alkyl groups ($R_1$ and $R_2$) may be selected such that the molecular weight of the silane oligomer does not exceed 30,000, and when the molecular weight of silane oligomer is 100 to 30,000 or 100 to 10,000, a compound suitable for forming a thin film on the surface of a substrate can be obtained.

Silane is a type of silicon hydride, whose formula is represented by $Si_nH_{2n+2}$. A silane compound means a compound in which one or more hydrogen of $Si_nH_{2n+2}$ are substituted by other groups. Compounds with various properties may be obtained depending on the type of substituent.

The silane compound having an $R_1$ group and the silane compound having an $R_2$ group may be anti-fingerprint coating compositions that can prevent fingerprints from standing out without any treatment. When the surface of products is coated with the silane compound, superior anti-fingerprint properties are obtained, but an oligomer formed by mixing the two silane compounds enables formation of a coating composition with improved anti-fingerprint and slip properties.

When the silane compound containing $R_1$ is mixed with the silane compound containing no $R_2$ in the absence of an additive such as distilled water ($H_2O$), the respective silane compounds are present in monomer states, coating films are formed on the substrate surface using this mixture, and improvement in slip property is low, as compared to coating each silane compound alone without using the mixture.

In one embodiment, when the two silane compounds are mixed with distilled water ($H_2O$), hydrolysis in which reactive groups excluding $R_1$ and $R_2$ groups bonded to Si of the respective silane compounds are converted into hydroxyl groups (OH—) occurs and condensation between molecules then occurs to form a silane oligomer represented by the following Formula 3.

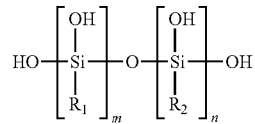

Formula 3

Any substance, and not just distilled water ($H_2O$) may be used as a substance added to the silane compound so long as it causes condensation of the silane compound and thus forms a silane oligomer. For example, various acids may be mixed with silane compounds to cause condensation and thereby form a silane oligomer.

When the reactive group bonded to Si is substituted by a hydroxyl group (—OH), as shown in Formula 3, it is easy to form a siloxane bond between the silane compound and the silicon dioxide layer and it is thus advantageous in terms of durability.

Hereinafter, aspects and embodiments of the present invention will be described with reference to the silane oligomer of Formula 3 produced by mixing the silane compound having $R_1$ and $R_2$ groups with distilled water ($H_2O$).

FIG. 1 is a view illustrating a phenomenon occurring when a silane compound according to one embodiment of the present invention is coated on the surface of the substrate. When thin films are formed by coating the silane oligomer of Formula 3 having $R_1$ and $R_2$ groups on the surfaces of displays of electronic products such as screens of TVs, monitor screens of PCs or notebooks, screens of mobile equipment such as cellular phones or PDAs, or touch panels of electronic products, alkyl groups of $R_1$ and $R_2$ are arranged outside the surface of the substrate, the groups directly contact fingerprints. Accordingly, fingerprints left on the surface of thin films are concealed due to characteristics of alkyl groups of $R_1$ and $R_2$ as described below. A detailed description thereof will be given below.

The hydroxyl group opposite to the alkyl groups of $R_1$ and $R_2$ in Formula 3 forms a siloxane bond with the substrate through chemical reaction to provide superior durability.

Figure 2:
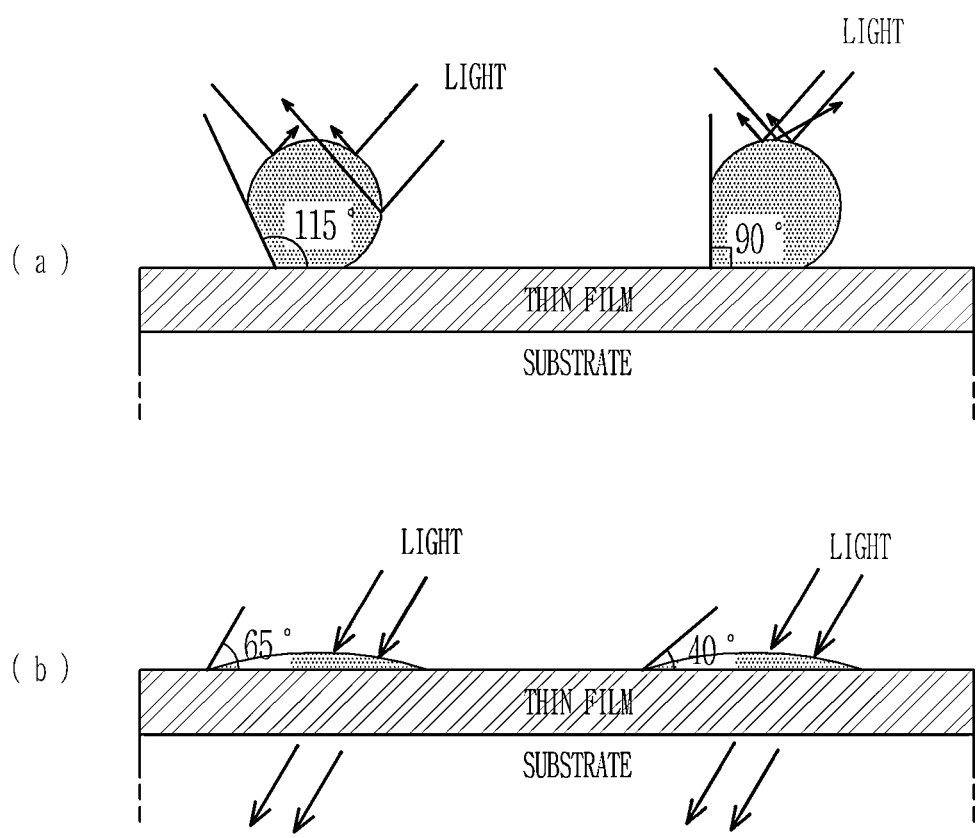
FIG. 2, part (a) is a view showing contact angles of water ($H_2O$) and diiodomethane present on the surface of a substrate coated with a silane compound containing fluorine (F) according to the related art and a reflection state of light.

FIG. 2, part (a) shows a state in which light is reflected when water ($H_2O$) and diiodomethane are present on the surface of thin films formed by coating a silane compound substituted by fluorine (F).

A contact angle of fluorine (F) to water is about 115 degrees and a contact angle thereof to diiodomethane is about 90 degrees. Contact angle means a predetermined angle that is formed with a solid surface and a liquid surface when a liquid droplet maintains a predetermined lens shape on the horizontal surface of a solid. A contact angle depends on the type of liquid and solid, and a liquid is considered to maintain its droplet shape on the surface of the solid and to not wet the surface thereof when a contact angle exceeds 90 degrees, and the liquid is considered to spread the solid and wet the surface thereof, when a contact angle is less than 90 degrees.

Since the contact angle of fluorine (F) to water and the contact angle thereof to diiodomethane are 90 degrees or higher, water ($H_2O$) and diiodomethane do not spread on the surfaces of fluorine-substituted silane compound thin films and maintain their droplet shapes.

As shown in FIG. 2, part (a), when light is irradiated to water and diiodomethane having large contact angles, scattered reflection occurs, causing fingerprints to be remarkably visible to the naked eye. Accordingly, when fingerprint components containing water and diiodomethane are left on the surface having a large contact angle between water and diiodomethane, the fingerprints are remarkably visible and thus appear to be dirty.

FIG. 2, part (a) shows a state in which light is reflected when water ($H_2O$) and diiodomethane are present on the surface of thin films made of the coating composition according to one embodiment of the present invention.

The coating composition according to one embodiment of the present invention is a silane compound of Formula 3. When a thin film is formed by coating the silane compound on the surface of the substrate, alkyl groups $R_1$ and $R_2$ are arranged outside and contact fingerprint components. The alkyl groups $R_1$ and $R_2$ have a contact angle to water of 60 to 80 degrees and a contact angle to diiodomethane of 45 degrees or less. Accordingly, water or diiodomethane left on the surface of the thin film broadly spreads and light irradiated thereto passes though the substrate without being reflected, as shown in FIG. 2, part (b).

Accordingly, although fingerprint components containing water and diiodomethane are left on the thin film, they thinly spread on the surface of the coating structure and are thus not remarkably visible and do not appear dirty.

The coating composition may be prepared by mixing silane compounds with distilled water since silane compounds and distilled water are liquids. However, in terms of preparation cost reduction, dilution in an organic solvent may be used. At this time, after the coating composition of Formula 3 is prepared by mixing two silane compounds with distilled water, the coating composition may be diluted in an organic solvent, or each of two silane compounds may be diluted in an organic solvent.

Useful organic solvents include alcohols such as methanol, ethanol, isopropanol, aliphatic hydrocarbons such as hexadecane, octane and hexane, cyclic hydrocarbons such as cyclohexane and cyclopentane, aromatic hydrocarbons such as toluene, xylene and benzene, organohalogen compounds such as carbon tetrachloride, chloroform and methylene chloride and the like. The organic solvents may be used alone or in combination thereof.

A process of forming a thin film on the surface of a substrate using the coating composition according to the embodiment of the present invention will be described with reference to FIG. 3.

Figure 3:
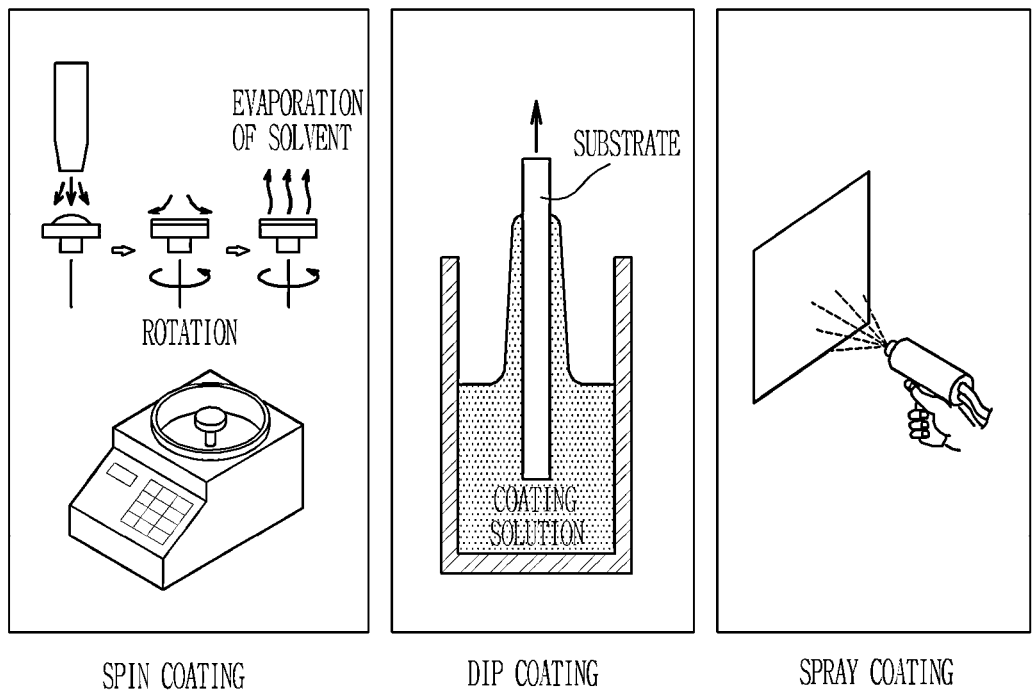
FIG. 3, part (a) and part (b) are views illustrating a process for coating the coating composition according to the one embodiment of the present invention on the surface of a substrate.
Figure 3:
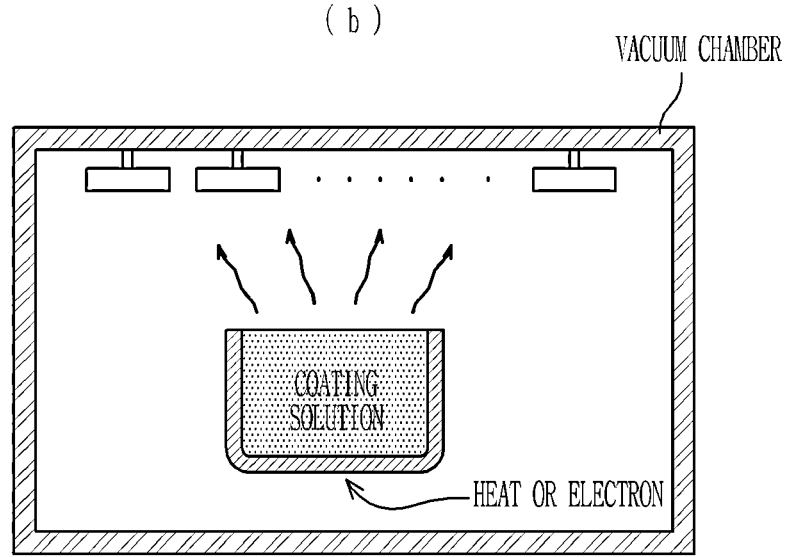

Wet and dry processes for forming thin films are illustrated in FIG. 3.

Referring to FIG. 3, part (a), dipping coating, spin coating and spray coating may be used as wet processes to form a thin film on the surface of liquid-type electronic products using the coating composition of the present invention.

Dip coating is a method in which a substrate for an electric product is dipped in a coating solution for a predetermined period of time and the material is separated therefrom to evaporate the solvent component. This method is generally used for coating substrates having an irregular surface, which depends on the substrate for the electronic product to be coated.

Spin coating is a method for forming thin films by spraying a coating solution on a rotating substrate, followed by drying and heating. This method is generally for forming thin films having a smaller thickness. Spin coating is a method for forming thin films based on the principle in which a liquid present on an object is forced out based on centrifugal force by rotating the object by a spin-coater. A thin film can be formed on the surface of the substrate by spin coating since the coating composition of the present invention is present in a liquid state, or diluted in an organic solvent.

Spray coating is a method for spraying a coating solution having a low viscosity through a spray nozzle. This method enables thin films to be uniformly formed even on substrates having an irregular or rough surface and uses a smaller amount of coating solution, as compared to dip coating, since the coating solution is applied only to one surface of the substrate and reduces energy required for evaporation. A thin film can be formed on the surface of the substrate using the coating composition of the present invention by spin coating since the coating composition has a low viscosity and users can use spray coating, while taking into consideration materials of electric products, as targets for formation of thin films, and environments of thin film formation.

The wet process of FIG. 3, part (a) is provided only for illustration of one example and other various wet processes may be used for formation of thin films using the coating composition of the present invention.

Referring to FIG. 3, part (b), vacuum deposition may be used as a dry process to form a thin film on the display or touch panel or the like of electronic products.

Vacuum deposition is a method for forming a thin film on the surface that faces an evaporation source by evaporating a metal or compound under vacuum. In one embodiment of vacuum deposition, a substrate is mounted on the ceiling of a chamber under vacuum such that the surface of the substrate to be coated is directed downward and a bath containing a coating solution is placed on the bottom of the chamber facing the substrate, and the coating solution is evaporated by application of heat or an electron beam. As a result, the evaporated coating solution is deposited on the surface of the substrate to form a thin film. The boiling point of the coating composition of the present invention may be varied depending on $R_1$ and $R_2$ groups. Accordingly, when thin films are formed through a vacuum deposition process, levels of heat or electron beam are determined taking into consideration boiling point of the coating composition.

Hereinafter, specific examples and test examples will be described.

PREPARATION EXAMPLE 1

Methoxyethoxyundecyltrichlorosilane, cyclohexyltrimethoxysilane and distilled water ($H_2O$) were mixed with one another at a weight ratio of 1:1:0.03.

COMPARATIVE EXAMPLE 1

Methoxyethoxyundecyltrichlorosilane and cyclohexyltrimethoxysilane were mixed with each other at a weight ratio of 1:1 without distilled water.

Figure 6:
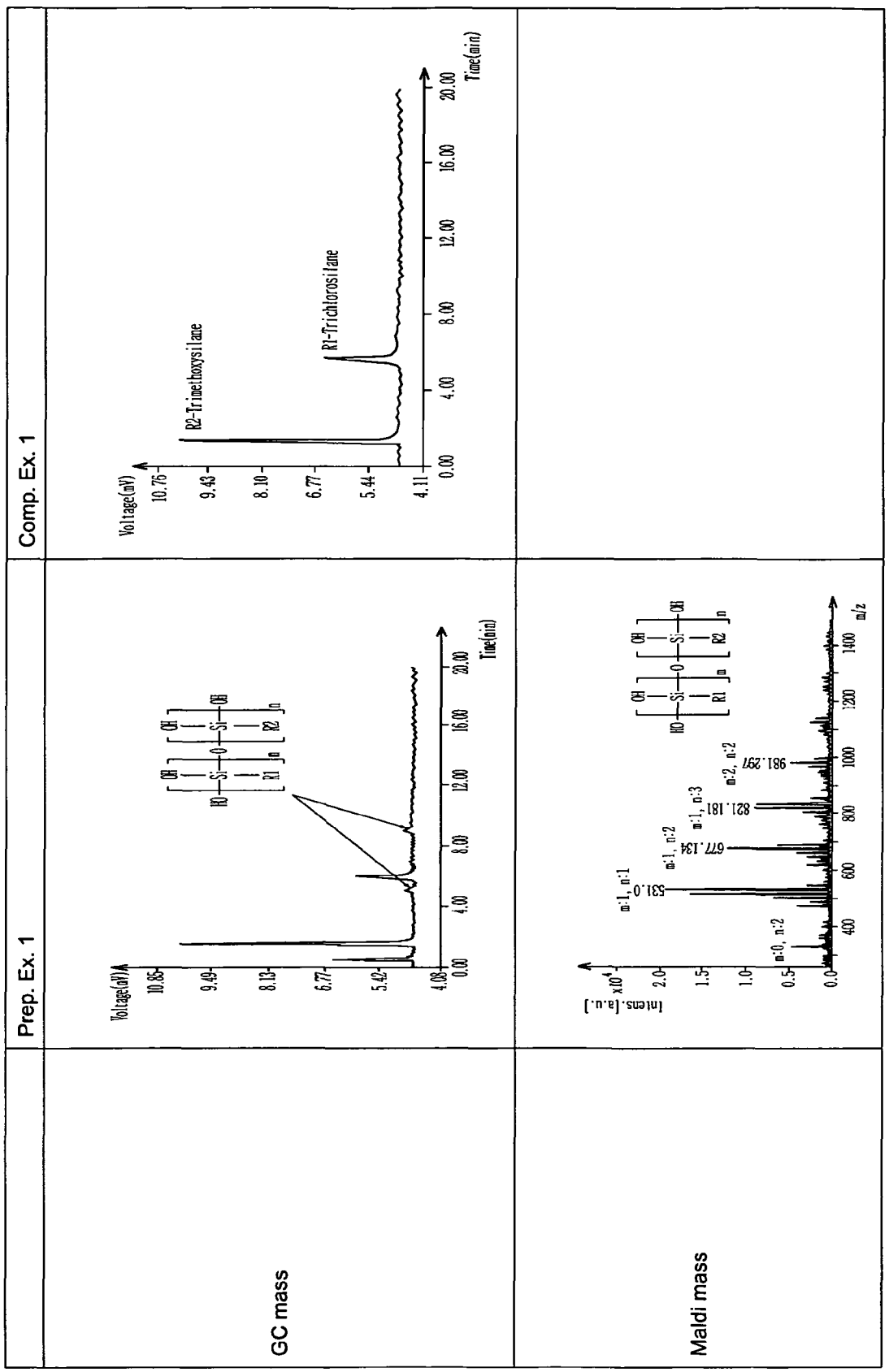
FIG. 6 shows Table 1.

The coating composition of Preparation Example 1 and the coating composition of Comparative Example 1 were analyzed using gas chromatography (GC) mass spectrometer and a Maldi mass spectrometer and the results thus obtained are shown in Table 1 of FIG. 6.

As can be seen from Table 1, as shown in FIG. 6, the coating composition prepared in Preparation Example 1 is present in an oligomer state, which means that reaction depicted by the following reaction scheme occurs.

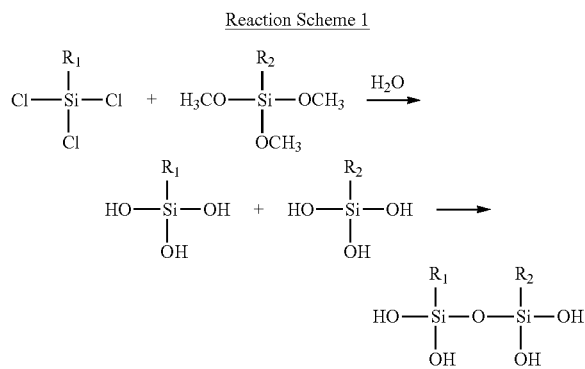

Reaction Scheme 1 wherein $R_1$ represents a methoxyethoxyundecyl group and $R_2$ represents a cyclohexyl group.

On the other hand, the coating compositions prepared in Comparative Example 1 are present in methoxyethoxyundecyltrichlorosilane and cyclohexyltrimethoxysilane monomers, respectively.

Hereinafter, test examples associated with physical properties of thin films formed on the surface of a substrate of a touch panel of a smartphone using the coating composition prepared in Preparation Example 1 and the test results are described.

Figure 4:
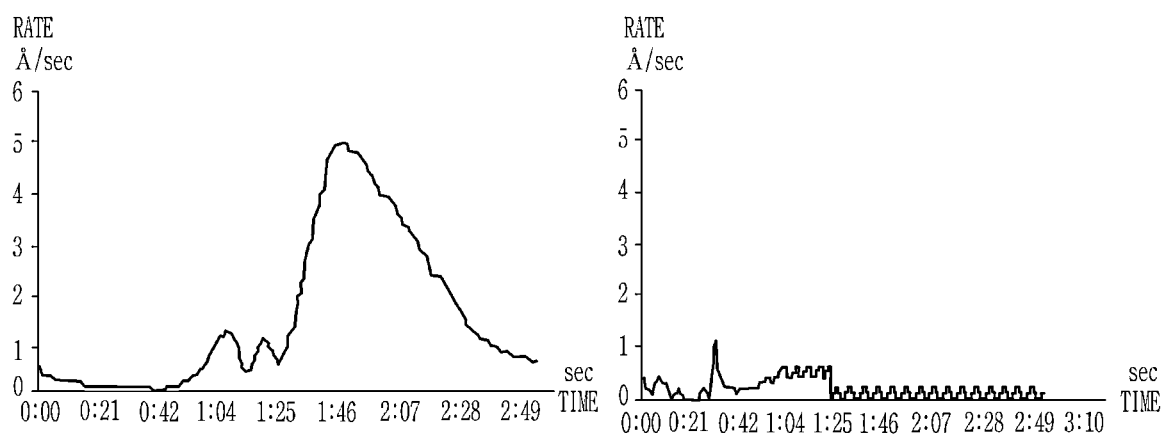
FIG. 4 is a graph showing a rate at which the coating composition of Preparation Example 1 is deposited on the surface of the substrate and a graph showing a rate at which the coating composition of Comparative Example 1 is deposited on the surface of the substrate.

First, the coating compositions prepared in Preparation Example 1 and Comparative Example 1 were coated on the surface of substrates by electron beam vacuum deposition and, at this time, deposition rates were measured. The graph showing the results thus obtained is shown in FIG. 4. Referring to FIG. 4, there was no great difference in deposition rate at the beginning of deposition but, about one second after deposition, the coating composition of Preparation Example 1 was deposited at high rate on the substrate surfaces.

In addition, a graph showing the coating composition of Preparation Example 1 was broad, while a graph showing the coating composition of Comparative Example 1 was considerably sharp. From these graph behaviors, it can be seen that the coating film using the coating composition of Preparation Example 1 exhibited superior surface uniformity.

After deposition, the thickness of coating film was measured. As a result, the coating composition of Preparation Example 1 had a thickness of about 250 Å and the coating composition of Comparative Example 1 had a thickness of about 50 Å. The display screen or touch panel of electronic products to which the present invention can be applied is subjected to frequent user contact and is exposed to atmosphere containing components such as salts. For this reason, when the coating films are thin, they are readily peeled. Accordingly, the coating composition of Preparation Example 1 provides stable durability or abrasion resistance.

In addition, coefficients of friction of a thin film made of the coating composition of Preparation Example 1 and a thin film made of the coating composition of Comparative Example 1 were measured. As a result, the thin film made of the coating composition of Comparative Example 1 was found to have a coefficient of friction of about 1.0, while the coating composition of Preparation Example 1 has a coefficient of friction of about 0.5. This means that the thin film made of the coating composition of Preparation Example 1 exhibited superior slip properties.

Thin films were formed on the surface of substrates using the coating composition prepared in Preparation Example 1 and a coating composition containing fluorine by electron beam vacuum deposition, water and diiodomethane were stained on the surfaces of thin films, and the thin films were subjected to four tests to confirm properties such as antifingerprint properties and durability. The coating composition comprising the silane compound containing fluorine was a coating composition of Comparative Example 2.

TEST EXAMPLE 1

Contact angles of water and diiodomethane stained on the surface of thin films made of the coating composition of Preparation Example 1 and Contact angles of water and diiodomethane stained on the surface of thin films made of the coating composition of Comparative Example 2 were measured.

TEST EXAMPLE 2

The surfaces of the thin film made of the coating composition of Preparation Example 1 and the thin film made of the coating composition of Comparative Example 2 were repeatedly erased by an eraser to test the maximum number of erasing processes, enabling the thin film to be resistant to abrasion.

TEST EXAMPLE 3

The thin film made of the coating composition of Preparation Example 1 and the thin film made of the coating composition of Comparative Example 2 were subjected to saline spray testing. The saline spray testing was a method to test resistance to an atmosphere containing salt, which determines qualities and uniformity of protected thin films. In this test, a 35° C. 5% aqueous NaCl solution was sprayed on the surfaces of the thin film made of the coating composition of Preparation Example 1 and the thin film made of the coating composition of Comparative Example 2.

TEST EXAMPLE 4

Fingerprint components were stained on the surfaces of the thin film made of the coating composition of Preparation Example 1 and the thin film made of the coating composition of Comparative Example 2, and whether or not the fingerprint components are readily visible to the naked dye in the presence of direct and indirect light (visibility) was observed.

The results are shown in Table 2 of FIG. 7 and Test Examples 1 to 4.

As can be seen from Table 2, as shown in FIG. 7, the thin film made of the coating composition of Comparative Example 2 had a contact angle to water of 115 degrees, while having a contact angle to diiodomethane of 90 degrees. For this reason, scattered reflection occurred and fingerprint components present on the thin films were remarkably visible. The thin film made of the coating composition of Preparation Example 1 had a contact angle to water of 70 degrees and a contact angle to diiodomethane of 40 degrees, thus being thinly spread, decreasing scattered reflection of light, being invisible and thereby improving anti-fingerprint properties, when fingerprint components are deposited thereon.

Regarding the number of erasing the thin film surfaces, the thin film made of the coating composition of Preparation Example 1 was not worn out until erasing was performed 10000 times, and the thin film made of the coating composition of Preparation Example 2 did not withstand 10000 erasing times. This means that the thin film made of the coating composition according to one embodiment of the present invention exhibited superior abrasion resistance or durability.

As a result of saline spray testing, the thin film made of the coating composition of Preparation Example 1 remained uncorroded, even after an aqueous NaCl solution was sprayed. The thin film made of the coating composition of Comparative Example 2 did not remain after an aqueous NaCl solution was sprayed. Accordingly, the thin film made of the coating composition of Preparation Example 1 exhibited superior corrosion resistance, as compared to the coating composition of Comparative Example 1.

Considering visibility test results, as can be seen from the images shown in Table 2 of FIG. 7, fingerprint components stained on the thin film made of the coating composition of Comparative Example 2 were remarkably visible in the presence of both direct light and indirect light, while the thin film made of the coating composition of Preparation Example 1 exhibited had low visibility in the presence of both direct light and indirect light, as compared to the case of Comparative Example 2.

Figure 5:
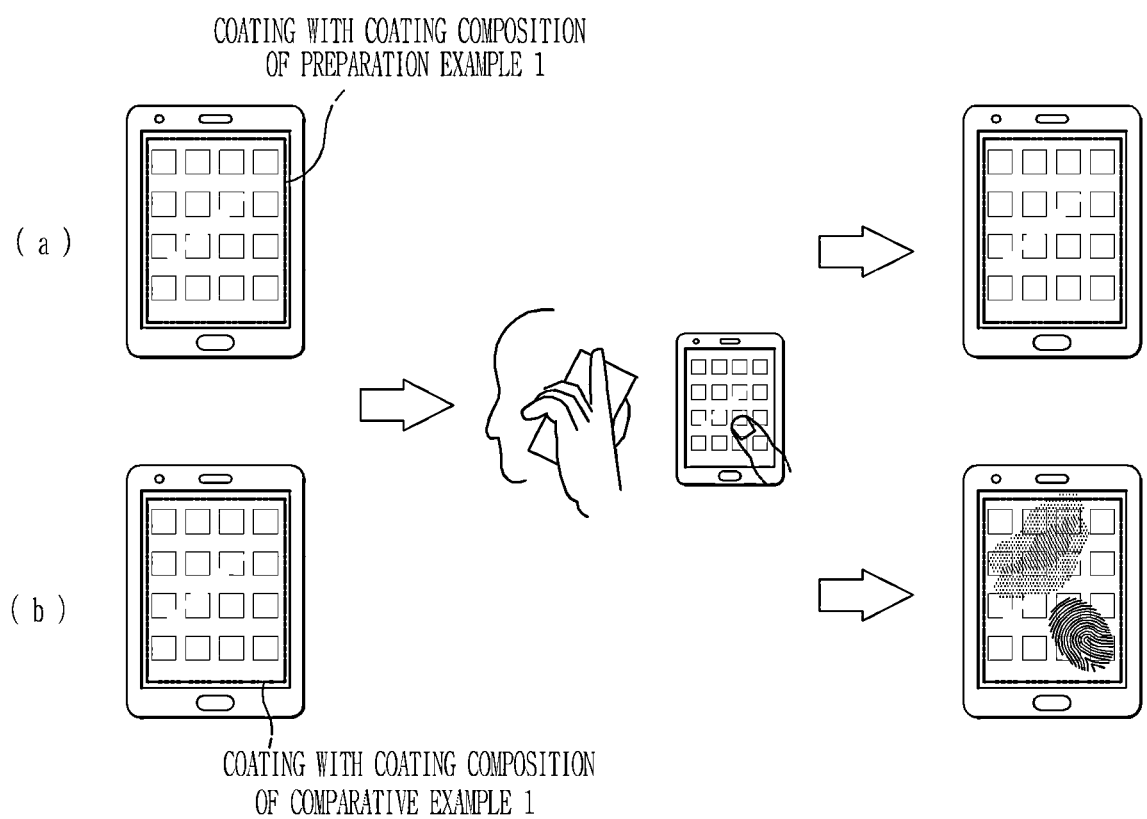
FIG. 5, part (a) and part (b) illustrate an image comparing a smartphone coated with the coating composition of Preparation Example 1 with a smartphone coated with the coating composition of Comparative Example 2.

FIG. 5 shows an image comparing a smartphone using the coating composition of Preparation Example 1 (coating composition according to one embodiment of the present invention) with a smartphone using the coating composition of Comparative Example 2.

Referring to FIG. 5, part (a) shows a smartphone using Preparation Example 1 and part (b) shows a smartphone using Comparative Example 2. In a case of calling using a smartphone, the face of users contacts the screen and oils or cosmetic components are thus stained thereon. In addition, in a case of searching or messaging using a smartphone, the screen is touched and fingerprints are thus deposited thereon.

Dirties present on the smartphone of part (a) are not readily visible due to the characteristics of the coating composition of Preparation Example 1. As mentioned above, the reason for this is that fingerprint components or oily components of the face broadly spread on the surface of a smartphone and are thus not readily visible, since the coating composition of Preparation Example 1 has small contact angles to water and diiodomethane.

On the other hand, oily components of the face or fingerprint components on the smartphone of part (b) were more visible and appeared dirtier, since the composition coated on the smartphone of part (b) had large contact angles to water and diiodomethane, as compared to the smartphone of part (a).

When thin films are formed using the coating composition, although fingerprints are adhered on the surface thereof, lipids of fingerprints broadly spread on the surface thereof and dirties caused by fingerprint components are thus not remarkably visible, and the thin films exhibit superior durability based on a siloxane bond with the substrate surface and the surface thereof can be thus clearly kept for a long period of time.

In addition, the coating composition according to the present invention enables formation of thin film coatings having a small coefficient of friction and thus exhibits superior slip properties, is readily cleaned when fingerprints are stained thereon and exhibits excellent touch feeling.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A coating composition comprising a silane oligomer having: an $R_1$ group represented by Formula 1 of [$R_aO$—$(CH_2CH_2O)_p$—$R_b$—] wherein $R_a$ is selected from the group consisting of hydrogen and an alkyl group having 1 to 3 carbon atoms; $R_b$ is selected from the group consisting of an alkyl group having 5 to 20 carbon atoms, an alkenyl group having 5 to 20 carbon atoms, an alkynyl group having 5 to 20 carbon atoms, an aryl group having 5 to 20 carbon atoms, an arylalkyl group having 6 to 20 carbon atoms, a cycloalkyl group having 5 to 20 carbon atoms and a heteroalkyl group having 5 to 20 carbon atoms; and p is an integer of 1 to 12; and an $R_2$ group represented by Formula 2 of $(R_c)_q$ wherein $R_c$ is a cycloalkyl group having 3 to 20 carbon atoms; and q is an integer of 1 to 3, wherein at least one reactive group bonded to a silicon of the silane oligomer is substituted by a hydroxyl group (—OH).

2. The coating composition according to claim 1, wherein the $R_1$ group is at least one selected from the group consisting of a methoxyethoxyundecyl group, a methoxytriglycoloxyundecyl group, a 3-methoxyethoxy-4-acetoxycyclohexylethyl group, a 16-(2-methoxy-ethoxy)hexadecyl group and derivatives thereof.

3. The coating composition according to claim 1, wherein the $R_2$ group is at least one selected from the group consisting of a 3-cyclopentadienylpropyl group, a dicyclopentyl group, a cyclopentyl group, a cyclohexyl group, a cyclooctyl group and derivatives thereof.

4. The coating composition according to claim 1, wherein the silane oligomer has a molecular weight of about 100 to about 10000.

5. The coating composition according to claim 1, wherein the silane oligomer has a structure of Formula 3 below,

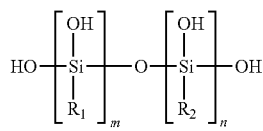

Formula 3 wherein m and n are each independently integers of 1 to 10.

6. An anti-fingerprint thin film formed by coating the coating composition according to claim 1 on a surface of a substrate.

7. The anti-fingerprint thin film according to claim 6, wherein the thin film formed using the silane oligomer has a contact angle to water of about 60 to about 80 degrees and a contact angle to diiodomethane of about 0 to about 45 degrees.

8. A coating composition comprising:
45 to 49.5% by weight of a silane compound represented by Formula 1 of [$R_aO$—($CH_2CH_2O$)$_p$—$R_b$—] wherein $R_a$ is selected from the group consisting of hydrogen and an alkyl group having 1 to 3 carbon atoms; $R_b$ is selected from the group consisting of an alkyl group having 5 to 20 carbon atoms, an alkenyl group having 5 to 20 carbon atoms, an alkynyl group having 5 to 20 carbon atoms, an aryl group having 5 to 20 carbon atoms, an arylalkyl group having 6 to 20 carbon atoms, a cycloalkyl group having 5 to 20 carbon atoms and a heteroalkyl group having 5 to 20 carbon atoms; and p is an integer of 1 to 12;
45 to 49.5% by weight of the silane compound having an $R_2$ group represented by Formula 2 of ($R_c$)$_q$ wherein $R_c$ is a cycloalkyl group having 3 to 20 carbon atoms; and q is an integer of 1 to 3; and
1 to 10% by weight of $H_2O$ or acid,
wherein at least one reactive group bonded to a silicon of the silane oligomer is substituted by a hydroxyl group (—OH).

9. The coating composition according to claim 8, wherein Formula 1 is at least one selected from the group consisting of a methoxyethoxyundecyl group, a methoxytriglycoloxy-undecyl group, a 3-methoxyethoxy-4-acetoxycyclohexylethyl group, a 16-(2-methoxy-ethoxy)hexadecyl group and derivatives thereof.

10. The coating composition according to claim 8, wherein the $R_2$ group is at least one selected from the group consisting of a 3-cyclopentadienylpropyl group, a dicyclopentyl group, a cyclopentyl group, a cyclohexyl group, a cyclooctyl group and derivatives thereof.

11. The coating composition according to claim 8, wherein the coating composition has a molecular weight of about 100 to about 10000.

12. An anti-fingerprint thin film formed by coating the coating composition according to claim 8 on a surface of a substrate.

13. The anti-fingerprint thin film according to claim 12, wherein the anti-fingerprint thin film has a contact angle to water of about 60 to about 80 degrees and a contact angle to diiodomethane of about 0 to about 45 degrees.

14. An electronic product having a display provided with an anti-fingerprint thin film, wherein the anti-fingerprint thin film has a contact angle to water of about 60 to about 80 degrees and a contact angle to diiodomethane of about 0 to about 45 degrees;
wherein the anti-fingerprint thin film includes a silane oligomer having:
an $R_1$ group represented by Formula 1 of [$R_aO$—($CH_2CH_2O$)$_p$—$R_b$—] wherein $R_a$ is selected from the group consisting of hydrogen and an alkyl group having 1 to 3 carbon atoms; $R_b$ is selected from the group consisting of an alkyl group having 5 to 20 carbon atoms, an alkenyl group having 5 to 20 carbon atoms, an alkynyl group having 5 to 20 carbon atoms, an aryl group having 5 to 20 carbon atoms, an arylalkyl group having 6 to 20 carbon atoms, a cycloalkyl group having 5 to 20 carbon atoms and a heteroalkyl group having 5 to 20 carbon atoms; and p is an integer of 1 to 12; and an $R_2$ group represented by Formula 2 of ($R_c$)$_q$ wherein $R_c$ is a cycloalkyl group having 3 to 20 carbon atoms; and q is an integer of 1 to 3,
wherein at least one reactive group bonded to a silicon of the silane oligomer is substituted by a hydroxyl group (—OH).

15. The electronic product according to the claim 14, wherein the $R_1$ group is at least one selected from the group consisting of a methoxyethoxyundecyl group, a ethoxytriglycoloxy-undecyl group, a 3-methoxyethoxy-4-acetoxycyclohexylethyl group, a 16-(2-methoxy-ethoxy)hexadecyl group and derivatives thereof.

16. The electronic product according to the claim 14, wherein the $R_2$ group is at least one selected from the group consisting of a 3-cyclopentadienylpropyl group, a dicyclopentyl group, a cyclopentyl group, a cyclohexyl group, a cyclooctyl group and derivatives thereof.

17. The electronic product according to the claim 14, wherein the silane oligomer has a structure of Formula 3 below,

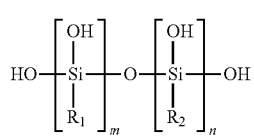

Formula 3 wherein m and n are each independently integers of 1 to 10.

* * * * *